Aug. 26, 1924.
H. W. PLEISTER
1,506,384
EXPANSION BOLT AND METHOD
Filed Oct. 4, 1922    2 Sheets-Sheet 2
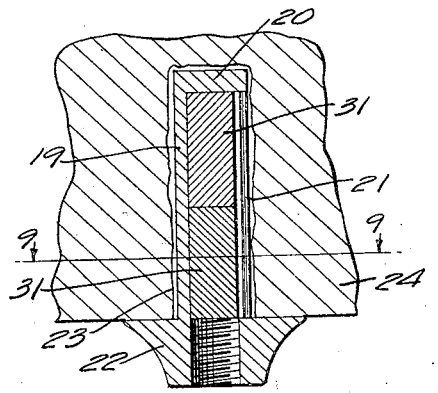
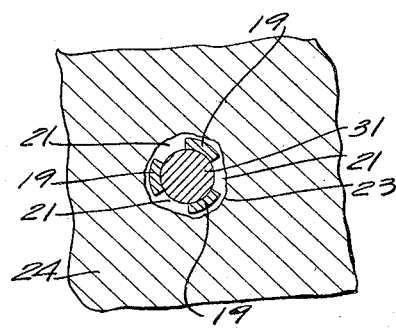
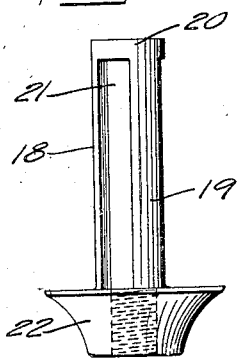
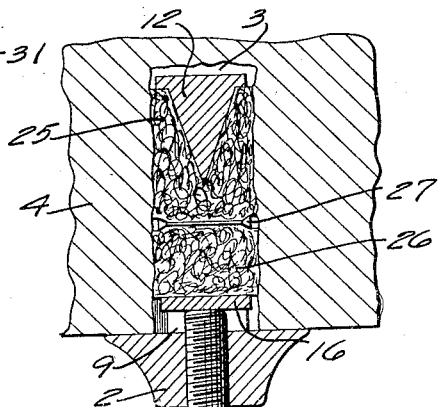
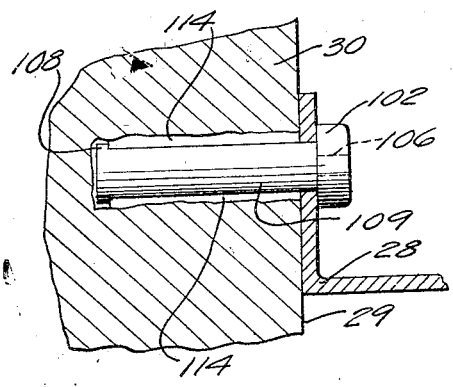
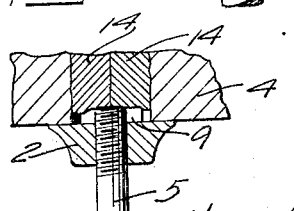
INVENTOR
Henry W. Pleister
BY
Alan― Johnson
ATTORNEY Patented Aug. 26, 1924.

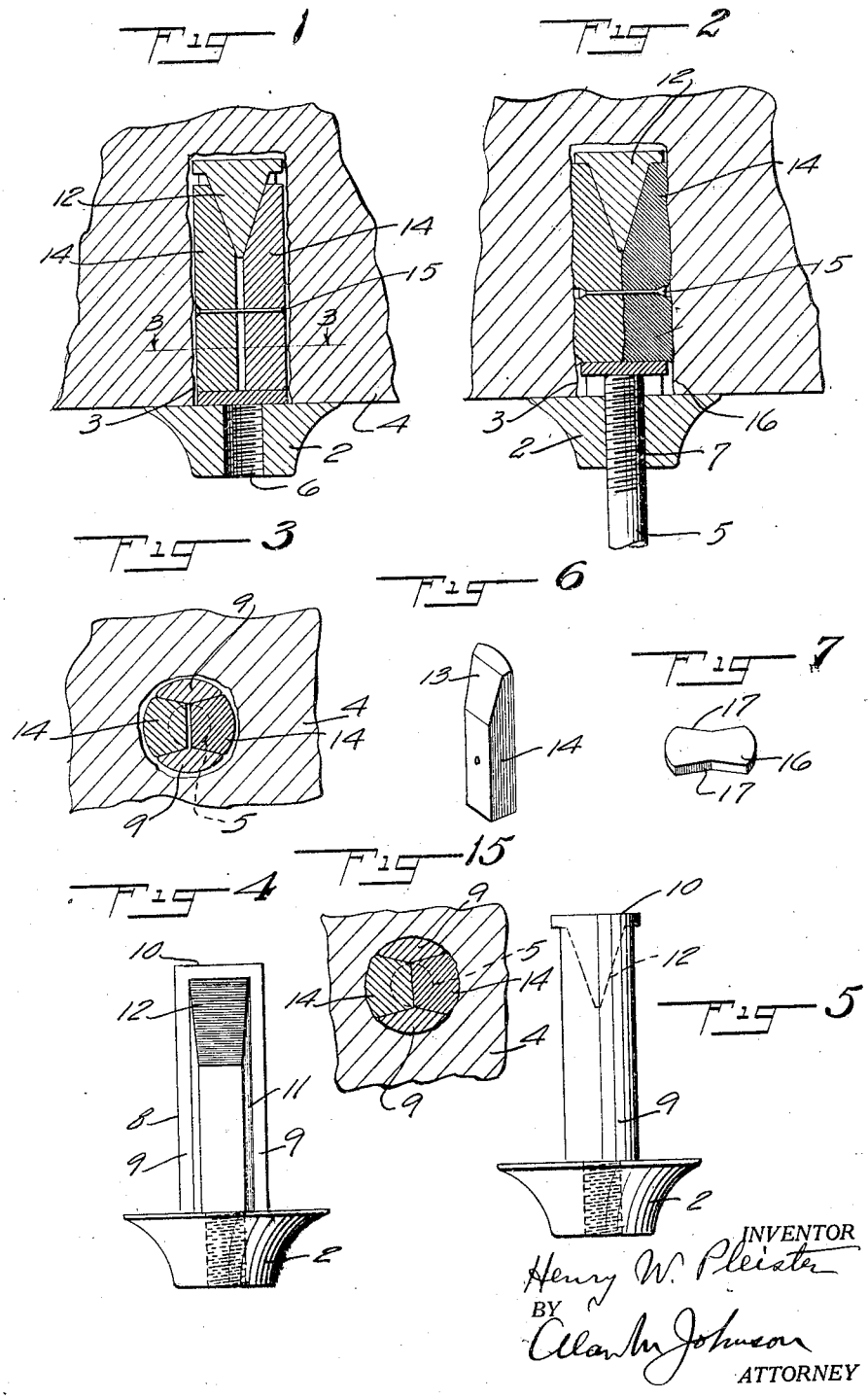

1,506,384

UNITED STATES PATENT OFFICE.

HENRY W. PLEISTER, OF WESTFIELD, NEW JERSEY, ASSIGNOR TO HENRY B. NEWHALL.

EXPANSION BOLT AND METHOD.

Application filed October 4, 1922. Serial No. 592,377.

*To all whom it may concern:*

Be it known that I, HENRY W. PLEISTER, a citizen of the United States, residing at Westfield, in the county of Union and State of New Jersey, have made certain new and useful Improvements in Expansion Bolts and Methods, of which the following is a description, taken in connection with the accompanying drawings.

My invention relates to a method and to an expansion bolt which can be used for general application. It is particularly adapted to be used with automatic sprinkling systems to hold the suspension rods for the pipes of such a system.

My invention further relates to certain methods, combinations, details of construction and articles of manufacture, which will be more fully hereinafter described and pointed out in the claims.

In the accompanying drawings, the same reference numerals refer to similar parts in the several figures.

Fig. 1 is a vertical section through a ceiling, wall or other suitable support, showing my expansion bolt before it is expanded;

Fig. 2 is a vertical section, similar to Fig. 1, showing the parts after expansion;

Fig. 3 is a section substantially on the line 3—3 of Fig. 1;

Fig. 4 is a side elevation of the preferred form of my expansion bolt;

Fig. 5 is a side elevation, similar to Fig. 4, the expansion bolt being rotated ninety degrees from the position shown in Fig. 4;

Fig. 6 is a detail perspective view of one form of expansible member which I preferably employ;

Fig. 7 is a perspective view of a movable plate which I preferably employ, but which may be omitted without departing from my invention;

Fig. 8 is a vertical section through a ceiling, wall or other suitable support showing a modification of my invention;

Fig. 9 is a cross-section substantially on the line 9—9 of Fig. 8;

Fig. 10 is a side elevation of the form of expansion bolt shown in Fig. 8;

Fig. 11 is a detail perspective view of one of the compressible members, which I may use in a modification shown in Fig. 8;

Fig. 12 is a sectional view showing a modified form of expansible member;

Fig. 13 is a vertical section through a ceiling, wall or other suitable support, showing the simplest form of my invention;

Fig. 14 is a fragmentary detail view showing the position of the parts when the movable plate is omitted;

Fig. 15 is a cross-section substantially on the line 15—15 of Fig. 2.

My invention is adapted for universal application wherever it is desirable to use an expansion bolt. It is particularly adapted for use in installing automatic sprinkling systems, and while I will describe it more particularly with relation to such a system it is to be clearly understood that my invention is not to be confined to such use.

In its broader aspects my invention consists in the method of securing an object to a ceiling, wall or other suitable support by forcing a compressible substance through openings in a substantially rigid member. Different shapes or contours can be given to the substantially rigid member, provided it has openings through which the compressible substance can be forced to engage with the sides of the hole so as to make a firm bond between the expansion bolt and the support. The material which is to be compressed may also vary with the particular work and the duty to be performed by the expansion bolt.

I have for purposes of illustration, shown my expansion bolt 1 provided with a flange, head or rosette 2, which covers and conceals the hole 3 within the ceiling or wall 4, so as to make a handsome and artistic job when used to support suspension rods 5 of automatic sprinkler systems. This flange or rosette 2 is provided with female screw-threads 6 to cooperate with the male threads 7 upon the suspension rod 5.

My expansion bolt in its simplest form may comprise any substantially rigid member having one or more openings through which the compressible material may be forced. In the preferred form of my invention, I make the rigid member 8 in the form of a cage, having side arms or walls 9, 9, a closed end 10, and slots or openings 11, 11. In the preferred construction I also provide the rigid member 8 with a wedge 12 to cooperate with the inclined surfaces 13, 13 upon the compressible members 14, 14. As shown in the preferred construction, these compressible members 14 are formed preferably of some ductile material, as for example lead, or a ductile alloy, and are mounted in the slots 11, 11 in the cage 8. To prevent these compressible members from becoming separated during handling or transportation, I secure them together in any suitable manner, such as by the rivet 15, after their inclined surfaces 13, 13 have been brought to bear on opposite surfaces of the wedge 12, Fig. 1. I also preferably mount within the cage 8, a movable plate 16, provided with cutaway surfaces 17, 17 to cooperate with the arms or side walls 9, 9. This movable plate is formed of steel or some metal of greater strength than that of the compressible material, whatever that material may be. While I preferably employ such a plate, it is to be distinctly understood, however, that it may be omitted, as shown, for example, in Fig. 14.

After the hole 3 has been formed in any suitable manner within the ceiling 4, my expansion bolt 1 is placed within the hole so that the flange or rosette 2 will cover the end of the hole, as shown for example in Fig. 1. A caulking tool of any suitable form (not shown) may be used which will pass through the opening in the flange or rosette 2 without cooperating with the screw-threads 6. By then hammering upon the caulking tool the removable plate 16, shown in Figs. 1 and 2, will be caused to move towards the wedge 12; this will compress the compressible members 14, 14 and cause a portion of said members to be forced out beyond the walls or arms 9, 9 so as to make a firm bond with the surfaces of the hole 3. At the same time, the inclined surfaces 13, 13 in the preferred form, will be caused to move up the surfaces of the wedge 12, which will still further spread the compressible members 14 laterally and increase the hold or grip of these members on the inner surfaces of the hole 3.

When a sufficient grip has been obtained within the hole 3, the caulking tool (not shown) is withdrawn. My expansion bolt will then remain in the ceiling or hole 3 until such time as it may be desirable to have it cooperate with a suspension rod 5. These rods 5 may be secured to my expansion bolt by simply screwing them within the head or rosette 2, as shown in Fig. 2. Ordinarily the expansion is done entirely with a caulking tool. In some cases, however, a further expansion may be obtained by causing the suspension rod 5 to engage with and move the movable plate 16, as shown in Fig. 2, or to engage directly with the compressible material, as shown for example in Fig. 14.

While the cage of my expansion bolt is rigid, or substantially rigid with relation to the particular form of compressible members that may be employed, I nevertheless preferably form the arms or sides 9, 9 of the cage so that when it is desired to get an extreme or maximum grip, additional blows transmitted through the caulking tool will cause the sides or arms 9, 9 to bulge slightly so that they, too, will engage more or less with the surface of the hole 3 and form an additional and stronger bond, as shown for example in Fig. 15. Ordinarily a sufficient grip, bond or hold will be given simply by compressing the compressible material located within the cage 8. It is only in exceptional cases where a stronger bond may be required for extra heavy pipes or extra heavy duty that this additional caulking need be employed. It will, therefore, be clear that a given size of my expansion bolt, will support ordinary and also extraordinary loads depending upon the degree of caulking to which it is subjected.

I have shown in Figs. 8, 9, 10 and 11 another modification of my invention in which the expansion bolt 18 has a rigid cage 19 closed at one end 20, provided with slots or openings 21, 21 and with the flange, head or rosette 22. Within this cage 19, I mount one or more compressible members 31 formed of any suitable material, which under pressure will be forced out through the slots or openings 21, 21 and engage with and form a firm bond with the surface of the hole 23 within the ceiling or other suitable support 24. I have shown in Fig. 8 two of these members 31. Preferably they are lead slugs or formed of some ductile material of less strength than the cage 19. In the form shown in Fig. 8, the caulking tool (not shown) can be brought directly in contact with the lower slug 31 to expand both members and force some of the lead or other compressible material through the slots 21, 21.

While I preferably employ lead or a ductile alloy it is to be distinctly understood that any form of compressible material may be employed. Among other compressible materials I may use lead-wool, fibrous composition, or in fact any material that is susceptible to pressure and elongation under the blows of a hammer or tool.

I have shown in Fig. 12 another modification in which I employ lead-wool, or other fibrous composition, formed in two compressible members 25, 26 connected together by means of a rivet 27 and cooperating with the cage such as shown in Figs. 1, 2 and 4.

In Fig. 13, I have shown the simplest form of my invention in which the flange, head or rosette 102 is reduced. The cage 108 is provided with the arms 109 and expansible members 114 and 114 the same in all essential respects as the corresponding elements shown in the preferred form in Figs. 1, 2 and 4. The head 102 is provided with an opening 106 for the reception of a caulking tool. The work 28 is secured to the surface 29 of the wall or other suitable support 20 by means of the head 102. The opening 106 need not be threaded when the expansion bolt is used as shown in Fig. 13, or used to fasten down any object to a floor, steps, walk or similar member.

I can use the same size expansion bolt with different size rods 5 by simply increasing or decreasing the size of the threaded opening 6. This permits the manufacturer to carry a minimum amount of stock on hand to fill orders for expansion bolts to cooperate with different size suspension rods.

Having thus described this invention in connection with illustrative embodiments thereof, to the details of which I do not desire to be limited, what is claimed as new and what is desired to secure by Letters Patent is set forth in the appended claims.

What I claim is:—

1. The method of securing a fastening to a wall, ceiling or other support consisting in inserting the fastening in the hole in the wall, ceiling or other support, pressing a compressible substance located within the fastening against an expanding member located in the fastening to force portions of the compressible substance radially through openings in the fastening by both compression and wedging action and into binding contact with the walls of the hole, and then securing the object to be supported to the fastening so held in the hole.

2. The method of securing a fastening to a wall, ceiling or other support consisting in inserting the fastening in the hole in the wall, ceiling or other support, pressing a compressible substance located within the fastening against a wedge located in the fastening to force portions of the compressible substance radially in two directions through openings in the fastening by both compression and wedging action and into binding contact with the walls of the hole, and then securing the object to be supported to the fastening so held in the hole.

3. The method of securing a substantially rigid expansion bolt to a wall, ceiling or other support consisting in inserting the substantially rigid expansion bolt in the hole in the wall, ceiling or other support, pressing a compressible substance located within the substantially rigid expansion bolt against an expanding member located in the substantially rigid expansion bolt, to force portions of the compressible substance radially through openings in the substantially rigid expansion bolt by both compression and wedging action, and into binding contact with the walls of the hole back from the surface of said wall or other support, and then securing the object to be supported to the substantially rigid expansion bolt.

4. A new article of manufacture comprising an expansion bolt having a hollow perforated portion adapted to extend into a hole and means to support a bolt or screw, compressible material mounted within the hollow perforated portion, and adapted to be forced radially through the perforations to make a bond or grip with a wall or other suitable support.

5. A new article of manufacture comprising an expansion bolt having a hollow perforated portion adapted to extend into a hole and another portion adapted to extend on the exterior of the hole to cover and conceal the hole and adapted to support a bolt or screw, and compressible material mounted within the hollow perforated portion, and adapted to be forced radially through perforations to make a bond or grip with a wall or other suitable support.

6. A new article of manufacture comprising an expansion bolt having a hollow perforated portion closed at one end, the other end of the expansion bolt being provided with a flange, head or rosette to extend out of a hole and conceal it, compressible material mounted in the hollow perforated portion, means to engage on the end of said compressible material and force portions of it out through the perforations in the hollow expansion bolt.

7. A new article of manufacture comprising an expansion bolt having a hollow perforated portion closed at one end, the other end of the expansion bolt being provided with a flange, head or rosette to extend out of a hole and conceal it, compressible material mounted in the hollow perforated portion, means to caulk the end of said compressible material to force portions of it out through the perforations in the hollow expansion bolt.

8. A new article of manufacture comprising an expansion bolt having a hollow perforated portion closed at one end, the other end of the expansion bolt being provided with a flange, head or rosette to extend out of a hole and conceal it, compressible material mounted in the hollow perforated portion, means to caulk the end of said compressible material to force portions of it out through the perforations in the hollow expansion bolt and a bolt or screw to cooperate with the flange, head or rosette.

9. A new article of manufacture comprising an expansion bolt having a substantially rigid cage closed at one end, and a flange, head or rosette at the other end adapted to extend on the outside of the hole and conceal it, compressible material mounted in the cage and adapted to be forced out of said cage by a caulking tool.

10. A new article of manufacture comprising an expansion bolt having a substantially rigid cage closed at one end, and a flange, head or rosette at the other end adapted to extend on the outside of the hole and conceal it, compressible material mounted in the cage and adapted to be forced out of said cage by a caulking tool and a bolt or screw adapted to be secured and held by the flange, head or rosette.

11. A new article of manufacture comprising an expansion bolt having a substantially rigid cage closed at one end and provided with expanding surfaces at the closed end to force the compressible material radially and with a flange, head or rosette at the other end adapted to extend on the outside of the hole and conceal it, compressible material mounted in the cage and adapted to be forced out of said cage by a caulking tool.

12. A new article of manufacture comprising an expansion bolt having a substantially rigid cage closed at one end and provided with expanding surfaces at the closed end to force the compressible material radially and with a flange, head or rosette at the other end adapted to extend on the outside of the hole and conceal it, compressible material mounted in the cage and adapted to be forced out of said cage by a caulking tool and a bolt or screw adapted to be secured and held by the flange, head or rosette.

HENRY W. PLEISTER.

Witnesses:
MARY R. RYAN,
MARGUERITE E. KUHN.